United States Patent [19]
Fischer et al.

[11] Patent Number: 4,863,351
[45] Date of Patent: Sep. 5, 1989

[54] AIRSCREW OR PROPELLER FOR PROPELLING AN AIRCRAFT

[75] Inventors: Hans-Otto Fischer, Willisch; Karl H. Gronau, Bonn, both of Fed. Rep. of Germany

[73] Assignee: Rhein-Flugzeug GmbH, Moenchen-Gladbach, Fed. Rep. of Germany

[21] Appl. No.: 300,273

[22] Filed: Jan. 19, 1989

[30] Foreign Application Priority Data

Jan. 19, 1988 [DE] Fed. Rep. of Germany ....... 3801353

[51] Int. Cl.$^4$ .................. B64C 11/18; F04D 29/38
[52] U.S. Cl. .................................. 416/203; 416/175; 416/202
[58] Field of Search .................. 416/203, 202, 175 R

[56] References Cited

U.S. PATENT DOCUMENTS

| | | | |
|---|---|---|---|
| 360,833 | 4/1887 | Vogelsang | 416/203 |
| 2,134,660 | 10/1938 | Everts | 416/202 X |
| 4,306,839 | 12/1981 | Pien | 416/203 X |

FOREIGN PATENT DOCUMENTS

| | | | |
|---|---|---|---|
| 3608565 | 9/1987 | Fed. Rep. of Germany | 416/203 |
| 138699 | 11/1979 | German Democratic Rep. | 416/203 |
| 85594 | 7/1981 | Japan | 416/203 |

Primary Examiner—Everette A. Powell, Jr.
Attorney, Agent, or Firm—W. G. Fasse; Kane, Jr. D. H.

[57] ABSTRACT

An airscrew for propelling an aircraft has a hub, a jacket and a plurality of propeller blades secured by blade necks to the hub. These blade necks are secured to the hub with symmetric or equal angular spacings around the hub between neighboring radial blade neck axes. Each propeller blade has a longitudinal axis. At least certain of these longitudinal blade axes extend at different sweep angles relative to the respective radial blade neck axis. When the sweep angle is positive the respective sweep of the blade is a positive sweepback with a trailing sweep of the respective blade relative to a rotational direction of the airscrew. When the sweep angle is negative the respective sweep of the blade is a negative sweep forward with a leading sweep of the respective blade relative to a rotational direction of the airscrew. These differing sweep angles achieve a substantial noise reduction compared to conventional airscrews having a completely symmetrical construction.

7 Claims, 4 Drawing Sheets 4,863,351

AIRSCREW OR PROPELLER FOR PROPELLING AN AIRCRAFT

FIELD OF THE INVENTION

The invention relates to an airscrew or propeller for propelling an aircraft. Such airscrews comprise a hub and several propeller blades secured to the hub.

BACKGROUND INFORMATION

The blades of conventional airscrews are normally secured to the hub through blade necks which are symmetrically distributed around the hub. More specifically, the angular spacing between the radial axes of the blade necks are equal to one another. The longitudinal axes of the blades also extend radially and coincide with the radial blade neck axes. Hence, the blades are also equally spaced from one another around the hub.

Airscrews rotating at high speeds, as is the case for propellers or fan drives, produce during their operation a noise level that depends on the circumferential speed of the airscrew and on the flight speed of the aircraft. Additionally, the noise level is influenced by or depends on the on-flow conditions, as well as the propeller blade configurations and on the loads to which the propeller blade is exposed. An especially irksome noise component is the so-called rotating noise of the airscrews since it involves higher frequencies which are subjectively noted more intensely than lower frequency noise components. This so-called rotating noise depends on the r.p.m. and on the number of blades in the airscrew.

Frequently, the r.p.m. and the number of blades are given values that are dictated by structural considerations. Thus, it is not normally possible to sufficiently change these values for positively influencing the rotating noise. Another aggravating factor is the amplification of the rotating noise by wake or trailing effects caused by obstructions in the on-flow of the airstream. Such obstructions can be struts or fairing elements of an aircraft and this amplification takes place each time when a blade moves past such obstructions.

It has been suggested for reducing the noise caused by exhaust fan wheels to arrange the wheel blades including their blade necks at differing pitches. In other words, the angular spacing between neighboring blades differs around the hub. As a result, it takes different time durations for the blades of such an exhaust fan rotor to pass by fixed points of the fan structure, thereby causing a frequency shift. Such a construction, however, is suitable only when blade angle adjustments, that is adjustments of the angle of attack of the blade, are not necessary. Such blade angle adjustments are, however, necessary, e.g. due to large changes in the on-flow speed of the air. These blade angle adjustments are required, for example, in connection with conventional propellers and so-called jacketed airscrews. The blade angle adjustments require involved mechanisms that need a certain volume within the screw hub for their location. Such volume needs cannot be ignored. Additionally, the adjustment mechanisms require respective adjustment forces for the operation of the mechanism which also imposes limitations on the construction of such adjustment mechanisms even when the blade necks are distributed symmetrically around the hub, that it, with equal angular spacings. A non-symmetric hub pitch for the individual blade necks would complicate the blade angle adjustment mechanism to such an extent that it could not be realized in any economically feasible way.

OBJECTS OF THE INVENTION

In view of the above it is the aim of the invention to achieve the following objects singly or in combination:

to construct an airscrew of the type mentioned above which will permit the use of equal pitches or angular spacings between the radial axes of the blade necks around the hub, thereby permitting the use of a relatively simple conventional blade angle adjustment mechanism, while simultaneously permitting different circumferential, angular spacings between the longitudinal blade axes of the individual neighboring blades, whereby the longitudinal blade axes do not necessarily extend radially relative to a roational axis of the hub;

to substantially reduce the noise caused by such airscrews, especially when they pass through the wake of an airstream;

to connect at least some of the blades of a multi-blade airscrew with different sweep angles to their respective radially extending blade necks; and to shape the blades of such airscrews to provide noise reducing blade configurations.

SUMMARY OF THE INVENTION

An airscrew according to the invention is equipped with a plurality of rotor blades at least some of which have differing sweep angles and the blades are connected to the hub through blade necks that are uniformly distributed around the hub with equal angular spacings between the radially extending blade neck axes. These equal angular spacings of the blade necks around the hub permit the use of a conventional blade angle adjustment mechanism. However, the angular spacings between neighboring blades, that is between the longitudinal axes of neighboring blades differ between at least some blades of the airscrew. This angular spacing between neighboring blades depends on the respective sweep angle or angles. The sweep angle is the angle between the radial blade neck axis and the longitudinal blade axis which may extend radially or not.

The invention makes it possible to combine the advantages of an uneven pitch of the blades around the hub with the advantages of an even pitch of the blade necks around the hub while simultaneously avoiding the disadvantages of conventional blade constructions. Further, the rotor blades according to the invention are fixed to the respective blade neck so that the blade has a positive or negative sweep angle relative to the radial direction of the respective blade neck axis. A positive sweep angle provides a sweepback or trailing sweep of the respective blade. A negative sweep angle provides a sweep forward or leaping sweep of the respective blade. The "trailing" or "leading" is considered relative to the respective radial blade neck axis and with reference to the rotational direction of the airscrew. The blades may have straight leading and tailing edges, or they may have curved leading and trailing edges, whereby the curvature of the leading and trailing edges could be the same. The configuration of the rotor blades may be adapted for noise reduction, for example, by providing the blades with a sickle shaped leading and/or trailing edge or with differing edge curvatures.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
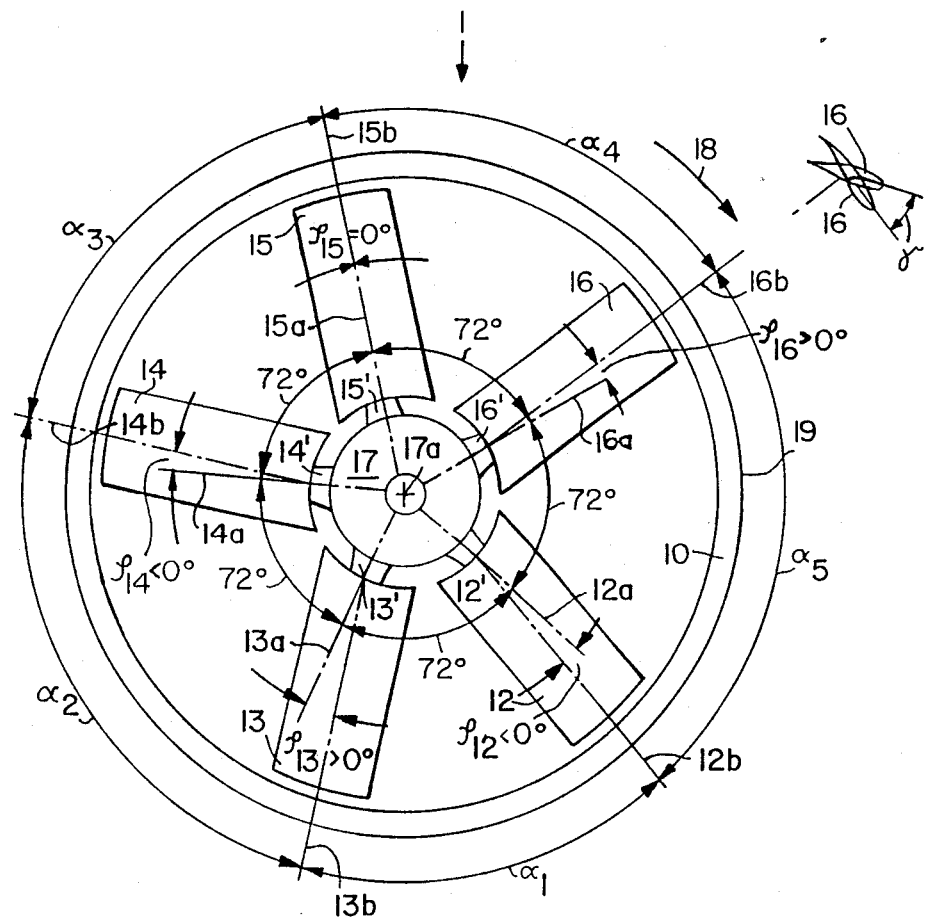
FIG. 1 is a plan view onto a first embodiment of an airscrew according to the invention having propeller blades with straight leading and trailing edges.

Referring to FIG. 1, an airscrew 1 having a jacket 10 comprises a hub 17 and five propeller blades 12, 13, 14, 15, and 16. These blades have blade necks 12', 13', 14', 15', and 16' by which the blades are connected to the hub 17. The radially inner ends of the blade necks are connected to the hub at equal angular spacings from one another around the hub so that the blade necks have an equal pitch. Specifically, the blade neck axes 12a, 13a, 14a, 15a, and 16a extend radially relative to the rotational hub axis 17a extending perpendicularly to the plane of the drawing sheet. Further, the blade neck axes 12a to 16a extend at equal angular spacings from each other. In the shown example with five blades the angular spacing is 72°. However, according to the invention, the blades 12, 13, 14, and 16 themselves are secured to the radially outer ends of the respective blade necks 12', 13', 14', and 16' so that the sweep angles $\phi_{12}$, $\phi_{13}$, $\phi_{14}$, and $\phi_{16}$ of these blades differ from zero and, if desired, from one another. Stated in other words, the respective sector angles $\alpha_1$ to $\alpha_5$, differ from one another. These sector angles $\alpha_1$, $\alpha_2$, $\alpha_3$, $\alpha_4$, and $\alpha_5$, extend between neighboring central longitudinal axes 12b, 13b, 14b, 15b, and 16b of the respective blades 12 to 16. In FIG. 1 all the blades have straight leading edges and straight trailing edges.

Each of the sweep angles $\phi_{12}$ to $\phi_{16}$ is defined between the central longitudinal axis 12b, 13b, 14b, 15b, and 16b of the respective blade 12 to 16 and the respective radial neck axis 12a, 13a, 14a, 15a, and 16a. In FIG. 1 the longitudinal central axis of the blades do not extend radially relative to the rotational hub axis 17a except the axis 15b which coincides with the neck axis 15a so that $\phi_{15}=0°$. The sweep angles $\phi_{12}$ and $\phi_{14}$ are smaller than 0°, in other words these sweep angles are negative and the respective blades 12 and 14 have a sweep forward or leading sweep relative to the respective radial neck axis 12a and 14a. The sweep angles $\phi_{13}$ and $\phi_{16}$ are larger than 0°, in other words these sweep angles are positive and the respective blades have a sweepback or trailing sweep relative to the respective radial neck axis 13a and 16a. The resulting unequal spacings between neighboring blades reduce the noise, especially the rotating noise, considerably. For this purpose the sweep angles are preferably within the range of 0°±30°.

The airscrew of FIG. 1 rotates clockwise as indicated by the arrow 18. Due to the differing sweep angles $\phi_{12}$ to $\phi_{16}$ the blades pass at different times, a point along the jacket 10, for example, the point 19 which is to symbolize a strut mounting the jacket 10 to a wing or the like. As a result, the blades generate a frequency shift which is desirable for advantageously influencing the generated noise and for reducing the noise as mentioned above. FIG. 1 further shows in the upper right-hand corner the blade 16 in two different positions to illustrate the adjustment of the blade angle of attack $\gamma$, which is accomplished by conventional means not part of the invention. The same is shown for blade 26 in FIG. 2.

Figure 2:
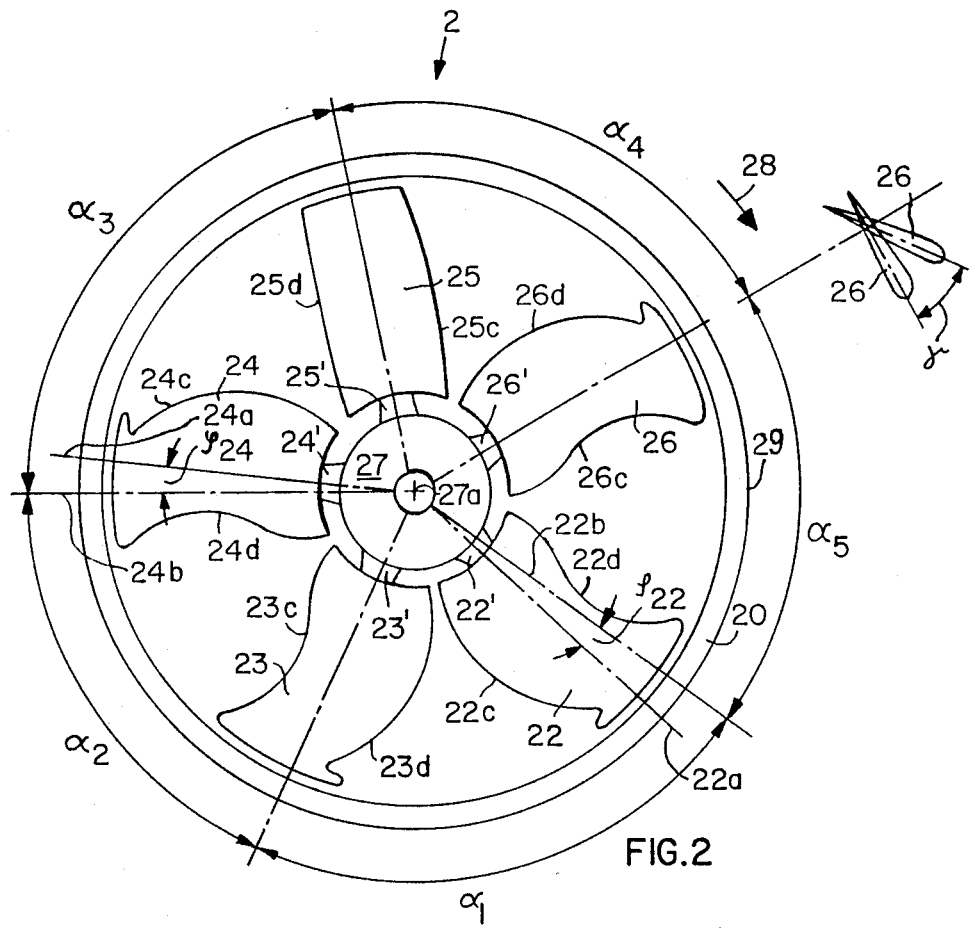
FIG. 2 is a view similar to that of FIG. 1, but showing sickle-shaped rotor blades and a rotor blade having a curved leading edge and a curved trailing edge.

As shown in FIG. 2, the rotor 2 has a hub 27 connected to the blades 22, 23, 24, 25, and 26 surrounded by the jacket 20. These blades have different configurations and circumferentially evenly spaced blade necks 22', 23', 24', 25', and 26', whereby the angle between neighboring radially extending blade neck axes is again 72°. However, the angles $\alpha_1$, $\alpha_2$, $\alpha_3$, $\alpha_4$, and $\alpha_5$ between neighboring longitudinal blade axes differ from each other to achieve the frequency shift according to the invention. One example for the angles $\alpha_1$ to $\alpha_5$ in FIG. 2 is as follows: 78°, 66°, 78°, 72°, and 66° respectively. The blade axes may extend radially.

The airscrew 2 of FIG. 2 has two blades 22 and 24 with a forwardly curved and hooked leading edge 22c and 24c. These blades 22 and 24 each have a sickle shaped trailing edge 22d and 24d, whereby the respective longitudinal central axis 22b and 24b is located closer to the trailing edge 22d and 24d than to the respective leading edge 22c and 24c. The terms "leading edge" and "trailing edge" are to be understood with reference to the direction 28 of rotation of the airscrew 2. The blades 26 and 23 have a configuration similar to that of blades 22 and 24, but with a reversed blade orientation. Stated differently, each of blades 26 and 23 has a sickle shaped leading edge 26c and 23c, and a backwardly curved and hooked trailing edge 26d and 23d, whereby the central longitudinal blade axis and the radial blade neck axis conincide with each other.

For blades 22 and 24 the radial blade neck axes 22a and 24a do not coincide with the respective longitudinal central blade axes 22b and 24b, whereby the respective sweep angles $\phi_{22}$ and $\phi_{24}$ are formed for achieving the above described frequency shift. The blade sweep $\phi_{22}$ and $\phi_{24}$ are positive sweep angles providing the respective blades with a sweepback, whereby the respective longitudinal blade axis 22b, 24b trails the corresponding radial blade neck axis 22a, 24a as viewed in the direction 28 of rotation about the rotational axis 27a of the hub 27.

The blade 25 has a curved leading edge 25c and an only slightly curved trailing edge 25d. The radial axis of the blade necks 23', 25', and 26' coincide with the respective longitudinal blade axis in FIG. 2.

As mentioned above, in accordance with the invention, the blades 22, 23, 24, 25, and 26 are connected with differing angular spacings around the hub 27 as indicated by the angles $\alpha_1$ to $\alpha_5$. Due to this arrangement, rotation of the airscrew in the clockwise direction as indicated by the arrow 28 assures that the time spacings between successive blades passing past a point 29 differ. As a result, a frequency shift toward lower frequencies takes place which is advantageous because lower frequency noise is more acceptable to the human hearing than high frequency noise.

It is an advantage of the invention that the claimed airscrew construction permits maintaining the symmetric distribution of the blade necks around the hub, while simultaneously permitting the non-symmetric distribution of the blades around the hub. Thus, differing sweep angles are possible. The sweep angle may be positive for a sweepback or negative for a sweep forward. In both instances a noise reduction can be realized and the noise frequency can be advantageously influenced so that high frequency noise is suppressed or not generated. Thus, the so-called rotating noise of a five blade airscrew can be advantageously influenced so that an airscrew with five blades has a noise characteristic corresponding to that of an airscrew having but one blade. It is now possible with the present teaching to establish by means of mathematical models, the acoustically most acceptable noise frequencies, including the harmonic frequencies and to thereby ascertain the required sweepback and/or sweep forward angle for the attachment of the blades to the blade necks. The present teaching can be applied with equal advantages to the rotors of exhaust fans and similar equipment.

Figure 3:
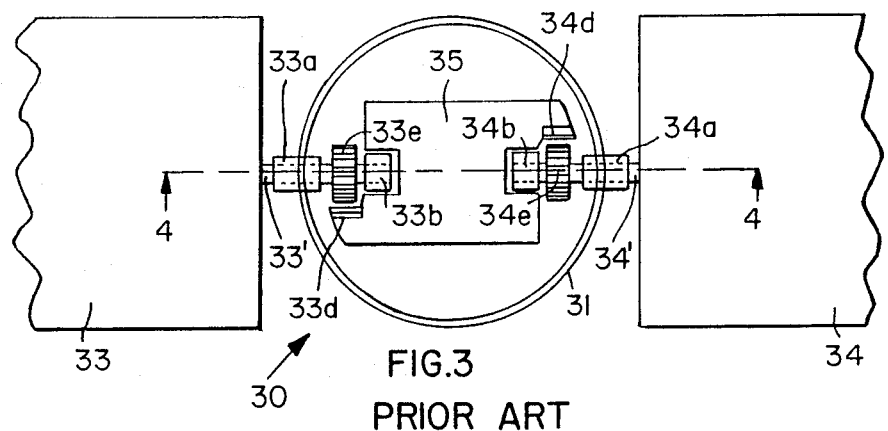
FIG. 3 is a view in the direction of the rotational axis of a rotor hub showing conventional means for adjusting the blade angle of attack.
Figure 4:
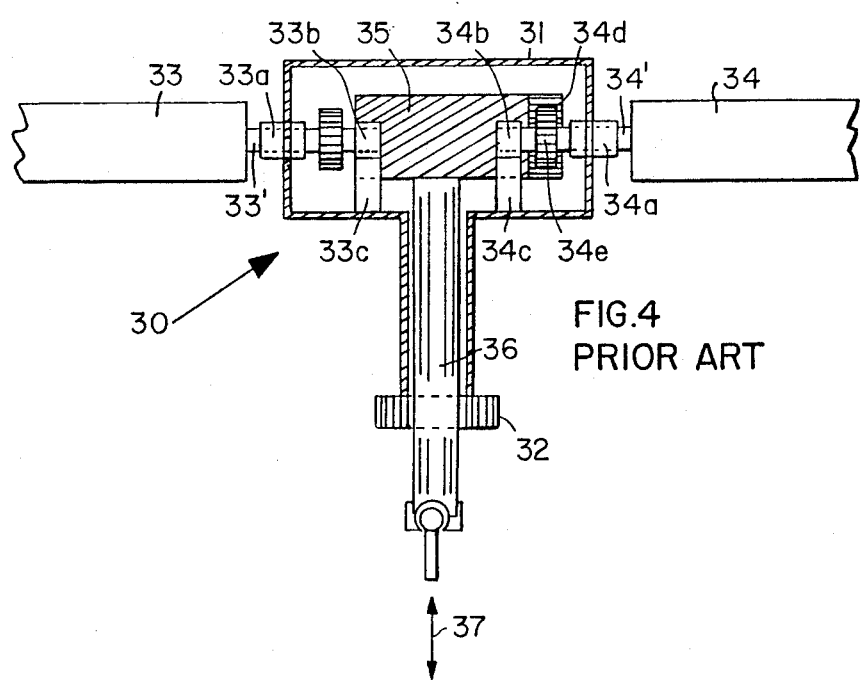
FIG. 4 is a sectional view along section line 4—4 in FIG. 3.

FIGS. 3 and 4 show a top view and an axial sectional view respectively of a conventional airscrew hub 30 in a hub housing 31 rotated by a drive gear 32. Two blades 33 and 34 are secured to the hub by blade necks 33' and 34' mounted in bearings 33a, 33b, and 34a and 34b respectively. The radially outer bearings 33a, 34a are mounted in the housing 31. The radially inner bearings 33b and 34b are mounted on supports 33c and 34c in the housing 31.

A blade angle adjustment rack member 35 has a first toothed rack 33d meshing with a pinion 33e for adjusting the angle of attack of the blade 33. The member 35 has a second toothed rack 34d meshing with a pinion 34e for adjusting the angle of attack of the blade 34. Due to the sectional view the rack 33d is not visible in FIG. 4. The adjustment of the blade angle shown in FIGS. 1 and 2 is accomplished by moving an adjustment rod 36 up or down as indicated by the double arrow 37.

It is an advantage of the invention that the conventional blade angle adjustment means shown in FIGS. 3 and 4 can be used in combination with the sweep angles of the invention which are, once selected for a particular type of airscrew, fixed by the construction of the connection of the radially inner end of the blade to the radillay outer end of the respective blade neck.

This is possible because the invention can be accomplished with an even distribution of the blade necks around the hub. The blades 33 and 34 in FIGS. 3 and 4 do not show a sweep angle. However, it will be appreciated that the sweep angles taught by the invention can be accomplished by the respective angled connection between the blade neck and the radially inner end of the respective blade, for example by a respectively angled flange.

Figure 5:
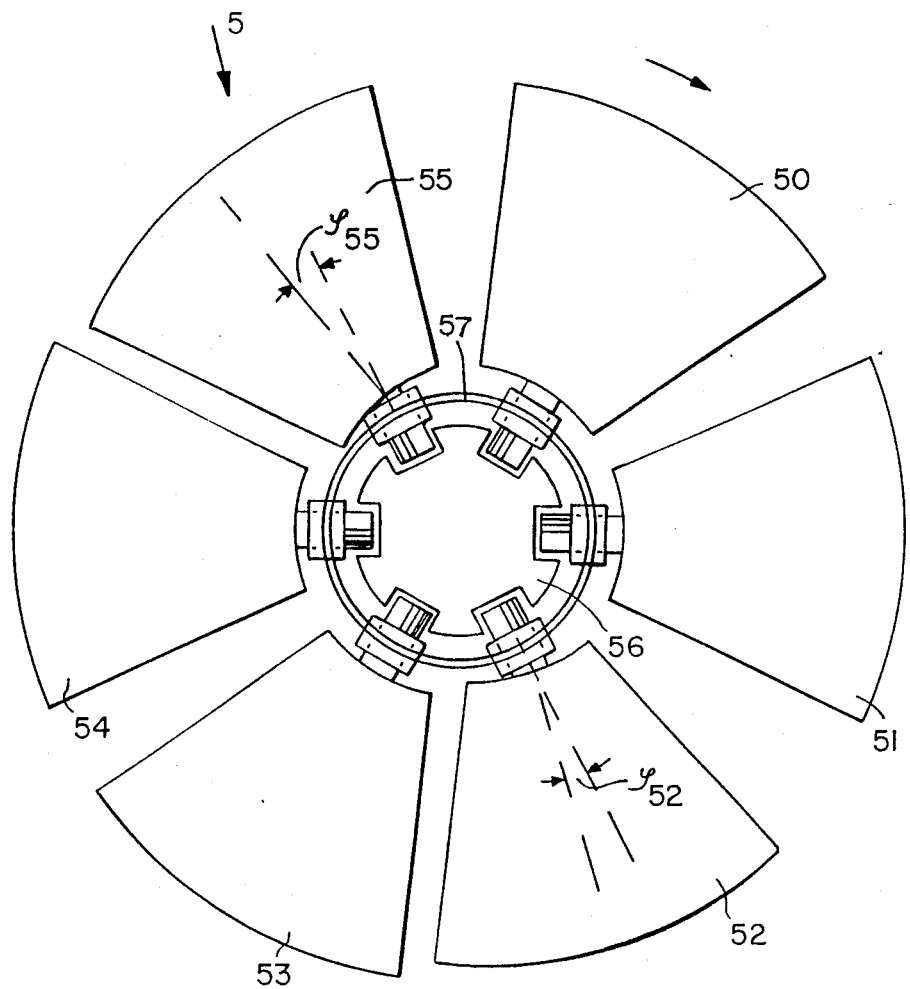
FIG. 5 is a plan view onto an airscrew of the invention with six blades illustrating another example of sweep angles in an airscrew with six blades of uniform configuration.

FIG. 5 shows an airscrew 5 with six blades 50, 51, 52, 53, 54, and 55 which are adjustable in their blade angle by a conventional mechanism 56 in the hub 57. Blades 52 and 55, for example, have respective sweep angles $\phi_{52}$ and $\phi_{55}$ for the above mentioned noise control. FIG. 5 is intended to illustrate, that the present teaching is applicable to any kind of blade configuration and to any type of airscrew.

Although the invention has been described with reference to specific example embodiments, it will be appreciated, that it is intended to cover all modifications and equivalents within the scope of the appended claims.

What we claim is:

1. An airscrew for propelling an aircraft, comprising a hub defining a rotational axis, a plurality of propeller blades, each propeller blade having a central longitudinal blade axis, a blade neck having a radial neck axis extending radially to said rotational axis for securing each propeller blade to said hub, each blade neck having a radially inner end operatively connected to said hub and a radially outer end operatively connected to its respective propeller blade so that all blade necks are spaced from each other at equal angular spacings between neighboring radial neck axes, each propeller blade being connected to its respective blade neck so that at least certain propeller blades of said plurality of propeller blades have sweep angles ($\phi$) that differ from the sweep angles of other propeller blades of said airscrew, said sweep angle being defined as an angle between said radial neck axis and the respective longitudinal blade axis.

2. The airscrew of claim 1, wherein said different sweep angles include positive sweep angles, whereby the respective blade has a trailing sweep relative to a direction of rotation of said airscrew.

3. The airscrew of claim 1, wherein said different sweep angles include negative sweep forward angles, whereby the respective blade has a leading sweep relative to a direction of rotation of said airscrew.

4. The airscrew of claim 1, wherein said propeller blades have straight leading edges and straight trailing edges.

5. The airscrew of claim 1, wherein said propeller blades have curved leading edges and curved trailing edges.

6. The airscrew of claim 1, wherein said propeller blades have sickle-shaped leading edges and sickle-shaped trailing edges.

7. The airscrew of claim 1, wherein said sweep angles are within the range of $0° \pm 30°$.